United States Patent
Clemens et al.

(10) Patent No.: US 12,090,938 B2
(45) Date of Patent: Sep. 17, 2024

(54) MOTOR-VEHICLE BUMPER ASSEMBLY

(71) Applicant: GEDIA GEBRÜDER DINGERKUS GMBH, Attendorn (DE)

(72) Inventors: Andre Clemens, Drolshagen (DE); Ralf Rottmann, Drolshagen (DE)

(73) Assignee: GEDIA GEBRUEDER DINGERKUS GMBH, Attendorn (DE)

( * ) Notice: Subject to any disclaimer, the term of this patent is extended or adjusted under 35 U.S.C. 154(b) by 320 days.

(21) Appl. No.: 16/972,599

(22) PCT Filed: Jun. 26, 2019

(86) PCT No.: PCT/DE2019/100595
§ 371 (c)(1),
(2) Date: Dec. 6, 2020

(87) PCT Pub. No.: WO2020/025080
PCT Pub. Date: Feb. 6, 2020

(65) Prior Publication Data
US 2021/0237671 A1     Aug. 5, 2021

(30) Foreign Application Priority Data
Aug. 1, 2018   (DE) .......................... 102018118658.4

(51) Int. Cl.
*B60R 19/18*     (2006.01)
(52) U.S. Cl.
CPC ........ *B60R 19/18* (2013.01); *B60R 2019/186* (2013.01)
(58) Field of Classification Search
CPC .. B60R 19/18; B60R 2019/186; B60R 19/285
See application file for complete search history.

(56) References Cited

U.S. PATENT DOCUMENTS

| 1,954,776 | A | | 4/1934 | Haynes | |
|---|---|---|---|---|---|
| 2,166,483 | A | * | 7/1939 | Bates | .................... B60R 19/285 249/174 |

(Continued)

FOREIGN PATENT DOCUMENTS

| CN | 108944760 A | * | 12/2018 |
|---|---|---|---|
| DE | 102013001585 A | | 8/2014 |

(Continued)

OTHER PUBLICATIONS

FR-2744407-A1 computer translation (Year: 1997).*

*Primary Examiner* — Amy R Weisberg
*Assistant Examiner* — Melissa Ann Bonifazi
(74) *Attorney, Agent, or Firm* — Andrew Wilford

(57) ABSTRACT

A bumper arrangement (1) for a motor vehicle, in particular for a lower load plane, wherein the bumper arrangement (1) has a bumper crossmember (2) and two spaced-apart supporting profiles (3, 3), the first ends (4, 4) of which are each fastened indirectly or directly to one of the two regions of the bumper crossmember (2) that are in the vicinity of the end and which are each fastened at a second end (5, 5) to chassis parts or longitudinal member parts (6) formed on the motor vehicle, wherein the bumper crossmember (2) is held by the supporting profiles (3, 3) on the vehicle structure and has a preferably symmetrically curved portion (7) in the form of a portion of a tube or a portion of a groove or a portion of a profile, wherein the portion (7) is fastened by its ends (8, 8') in the vicinity of the second ends (5, 5') of the supporting profiles (3, 3') to the chassis parts or longitudinal member parts (6), wherein the curved portion (7) is shaped in a manner projecting with a central region (9) to the bumper crossmember (2) and therefore at least lies against the bumper crossmember (2).

17 Claims, 3 Drawing Sheets

(56) References Cited

U.S. PATENT DOCUMENTS

| | | | | |
|---|---|---|---|---|
| 2,314,600 | A | * | 3/1943 | Reyburn ............... B60R 19/285 |
| | | | | 293/144 |
| 3,850,466 | A | | 11/1974 | Yepis |
| 6,932,398 | B2 | * | 8/2005 | Frank ..................... B60R 19/24 |
| | | | | 296/187.03 |
| 2005/0029821 | A1 | * | 2/2005 | Evans ..................... B60D 1/56 |
| | | | | 293/133 |
| 2011/0109122 | A1 | | 5/2011 | Clausen |

FOREIGN PATENT DOCUMENTS

| | | | | |
|---|---|---|---|---|
| FR | 643811 | B | 5/1928 | |
| FR | 2744407 | A1 * | 8/1997 | ............. B60R 19/18 |

\* cited by examiner

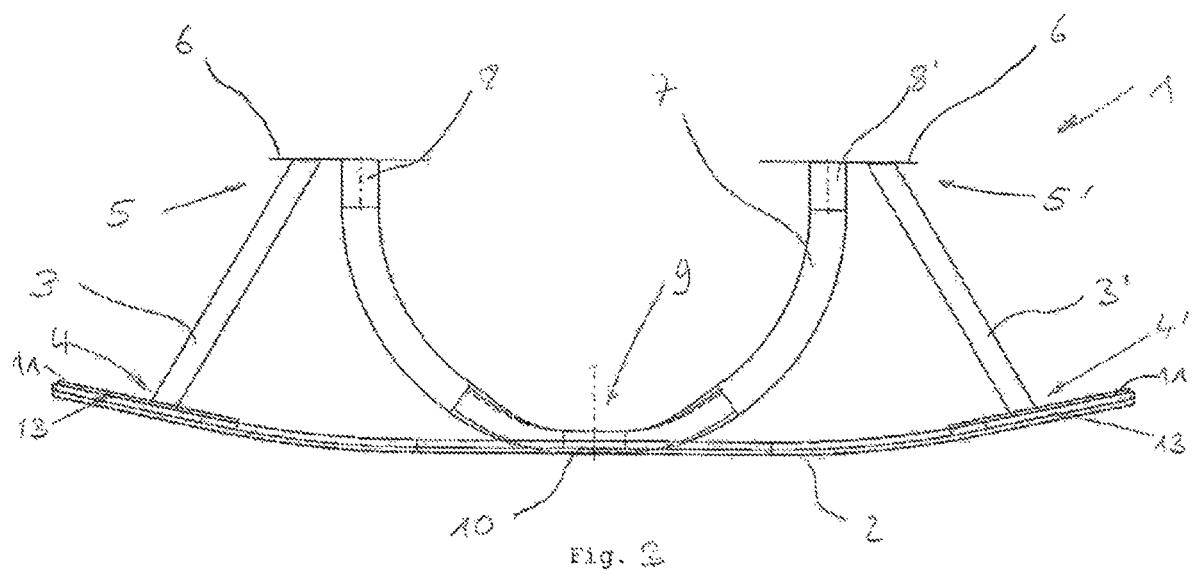
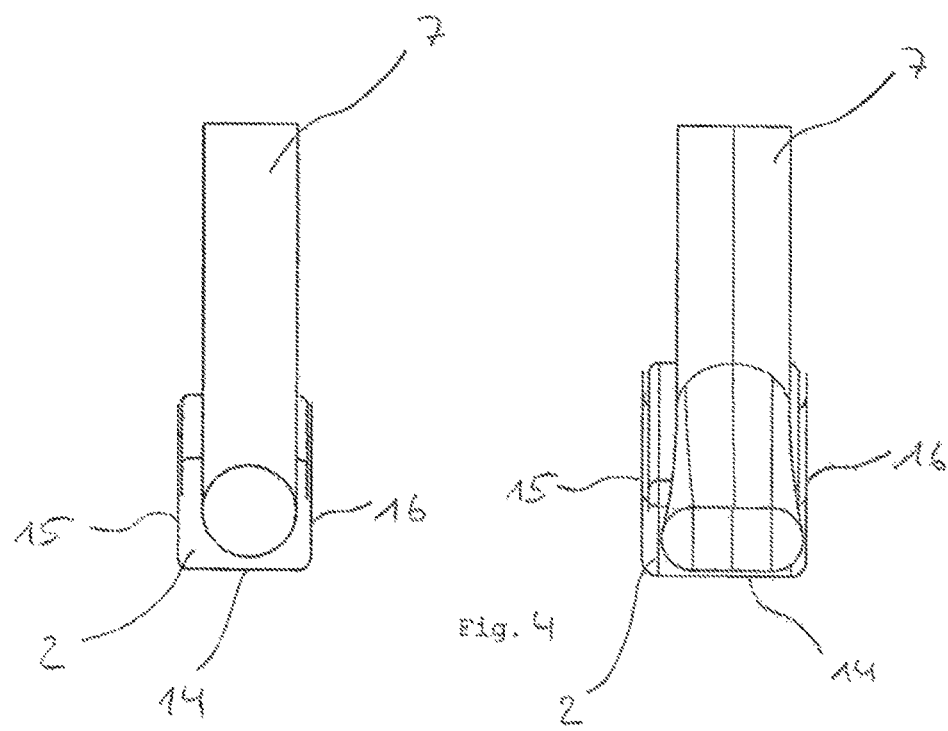

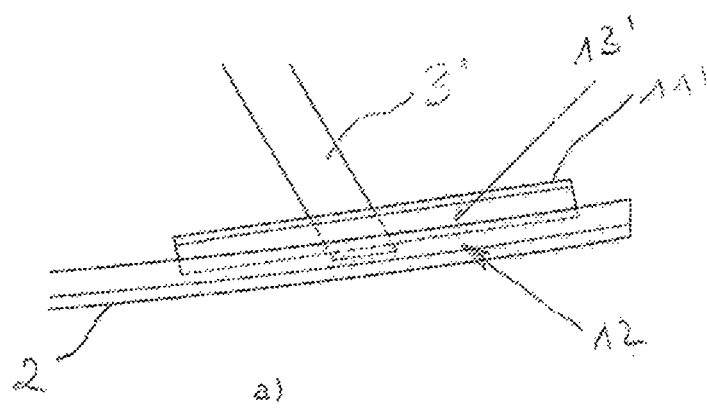
a)
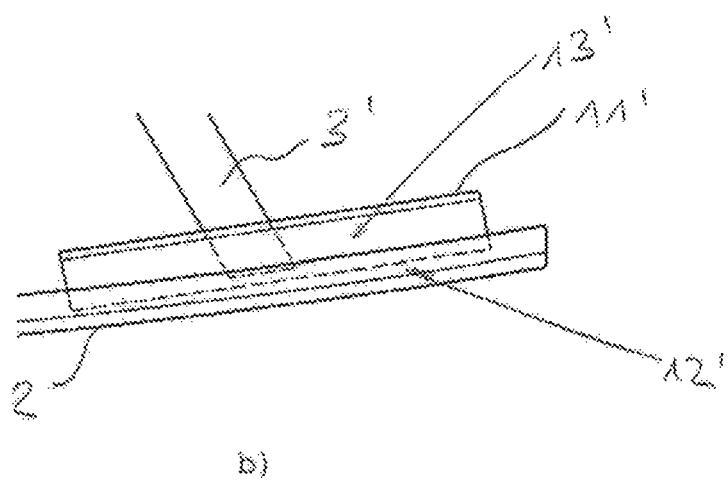
b)
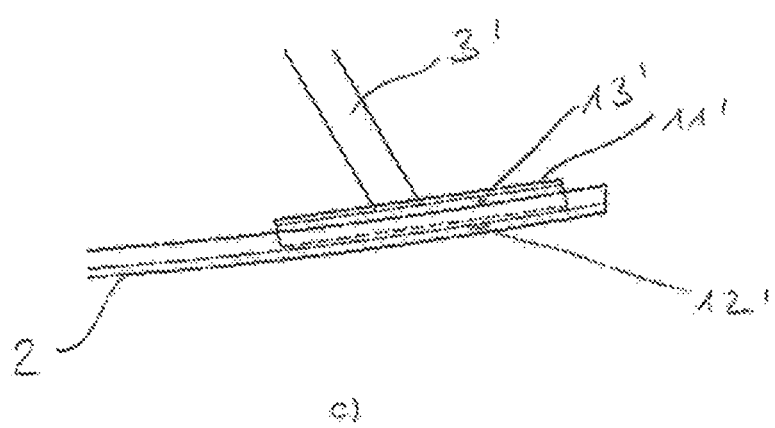
c)
Fig. 5

MOTOR-VEHICLE BUMPER ASSEMBLY

CROSS REFERENCE TO RELATED APPLICATIONS

This application is the US-national stage of PCT application PCT/DE2019/100595 filed 26 Jun. 2019 and claiming the priority of German patent application 102018118658.4 itself filed 1 Aug. 2018.

The invention relates to a bumper assembly for a motor vehicle, in particular for a low load plane.

Bumper assemblies for the low load plane are known in the prior art. They serve to reduce the kinetic energy transmitted to the vehicle by impact plastic deformation of the bumper assembly or its components over a defined path. This will reduces or prevents injury from the impact to the vehicle occupants, to the vehicle structure and to adjacent components adjacent.

The object of the invention is to provide an inexpensive bumper assembly of low weight, which in the event of a frontal collision with the vehicle absorbs energy better and allows the absorption of larger energy. At the same time, the connection to the vehicle frame is to be preserved or improved.

In addition, there should be a variety of products, i.e. alternative constructive solutions, made available.

To attain the object, the invention proposes that the bumper assembly has a bumper cross member and two spaced mounting struts each having an outer end directly or indirectly attached at or near a respective one of the ends of the bumpers and an inner end fixed to the chassis of the motor vehicle or its frame, the cross member being carried by the mounting struts on the vehicle structure and a preferably symmetrically curved brace in the form of a tube, channel, or profile, the brace having ends attached to the chassis or frame near the inner ends of the mounting struts, the curved brace projecting with a center part to the bumper cross member and at least bearing on the bumper cross member.

The curved brace is behind the cross member and abuts with a center part on the cross member, where the term abut is also to be understood that a gap can be provided between the center part and the cross member, in order to avoid any rattling noises that may arise when driving.

Due to the brace, in a frontal crash the cross member is supported and reinforced on the back side, the impact deforming both the cross member and the curved brace so that a higher impact energy can be absorbed.

Since the bent brace bears with a center part on the cross member, the cross member is supported and reinforced from the back during and immediately after the impact. Due to the preferably symmetrical shape of the brace that is bent toward the cross member, the brace has an optimal shape in order to keep the energy introduced evenly distributed along a defined path.

In the event of an impact acting centrally on the vehicle, such as in a pile test, the transverse beam and the curved brace therebehind deform around the obstacle (for example the pole) and absorb the energy introduced, with the frame connection being improved at the same time. The mounting struts serve to hold the cross member on the vehicle structure. During an impact, the mounting struts are partially deformed and absorb part of the impact energy, and the mounting struts at the same time support the end regions of the cross beam and permit the cross member and the curved brace to buckle at the desired points. This arrangement enables an even and increased energy dissipation, while at the same time ensuring the connection to the vehicle frame.

The arcuate brace is of tubular, channel or profile section so that it has low weight.

Furthermore, the object is achieved in that the bumper assembly has a cross member and two spaced mounting struts whose outer ends are each attached indirectly to a respective one of two end regions of the bumper cross member are and whose inner ends are attached to the vehicle chassis or frame, the bumper cross member being carried by the mounting struts on the vehicle.

The mounting struts carry the cross member on the vehicle structure. While an impact partially deforms the mounting struts so they absorb part of the impact energy, the mounting struts at the same time support the regions of the cross member near its ends and facilitate a buckling of the crossbeam so that it deforms plastically in the desired places.

It is preferably provided that the curved brace and/or the mounting struts are of a round, square, oval, U-shaped or generally semicircular cross section.

This creates a particularly inexpensive bumper assembly with a low weight.

Preferably provided the brace is curved in a semicircular shape.

Because the brace is evenly curved to form a semicircle, it can be manufactured particularly inexpensively.

Alternatively, it can preferably be provided that the brace is bent in a C-shape.

The C-shaped brace has straight portions connected to the chassis or frame. These straight regions advantageous deform at the ends, so that improved energy absorption is achieved, at the same time as the connection of the vehicle frame is improved.

The curved brace has straight center part at least where it bears on the cross member.

The straight center part bears on the cross member so that the center part makes surface rather than point contact with the cross beam. This has the advantage that the crossbeam is supported over a larger region on the back and also when an obstacle hits the front of the vehicle is off-center the cross beam and brace deform uniformly. In addition, lateral sliding of the brace is prevented by the larger contact surface when an obstacle hits the front of the vehicle off center.

The brace and/or the mounting struts regions has or have different cross sections.

This allows the mounting struts and/or the brace to be adjusted so that a particularly advantageous deformation and a uniform dissipation of energy can take place.

An oval cross section in contact with the transverse support is particularly advantageous. Due to the oval cross section, there is a surface contact with the cross member that prevents an off-center obstacle hitting the front of the vehicle from laterally sliding of the brace.

It is also preferably provided that the cross section of the brace tapers toward center part.

In the event of a front impact, the cross member and the center part brace are first deformed approximately in the middle. the tapering cross section of the brace in this region ensures easier deformation so that the deformation path is particularly uniform and advantageous energy absorption can take place.

It is preferably provided that the brace and/or the mounting struts are made of steel, aluminum or magnesium or made of fiber composite.

These allow inexpensive production.

It is preferably also provided that the brace and/or the mounting struts have regions of lower strength.

This allows the mounting struts and/or the brace to be adjusted so that a uniform and particularly advantageous deformation of the parts takes place and a uniform energy degradation can take place.

A brace has a center part has a lower strength imparting particularly advantageous deformation properties.

In addition, it can preferably be provided that the center part on bears on the cross member and is frictionally, positively or materially connected with it.

As a result, for example in the event of an eccentric impact, the brace and a possibly associated deterioration of the deformation and energy absorption can be prevented.

It is preferably provided that the outer ends of the mounting struts are attached via respective hollow shaped bodies made of sheet metal to the bumper cross member, the hollow bodies having, first and second has side walls extending parallel to each other and to the bumper cross beam and at least one base wall connecting the side walls, the shaped body being fixed to the cross member or to parts of the cross member and the outer ends of the mounting struts being fixed to the shaped body.

An additional deformation element is provided by the hollow shaped body between the outer ends of the mounting struts and the cross member. The shaped body is fixed to the cross member.

The cross member can, for example, be of U-section with a base and two side flanges projecting therefrom. The base is the obstacle-facing surface, and the side flanges project toward the vehicle structure from edges of the base.

The shaped part has two side walls and at least one connecting base wall, so that it is, for example, U-shaped or square or has a rectangular cross section.

The side walls of the shaped part are parallel to the cross member, in particular to arranged base of the cross member.

The shaped part can, for example, be attached by one of its side walls to the base of the cross member. But its base wall can also for example be attached with one the side flanges of the cross member.

It is preferably provided that there is a gap between the cross member and the first side wall.

The size of the gap can be chosen as desired so that there is a larger or smaller spacing between the first side wall and the cross member is provided, so that the gap in the event of a light impact allows damage to the cross member, but no damage to the hollow brace.

It is preferably provided that the outer end of each mounting strut is fixed with its end face to the second side wall of the shaped part.

In the event of an impact, this means that the shaped part is first deformed before deformation of the mounting strut. If it is a light impact, only that will be partly deformed. The mounting struts will remain undamaged.

The mounting struts, for example, are welded to the front side of the shaped part and hold the cross member on the vehicle.

Alternatively, it can preferably be provided that the outer end of each mounting strut projects through at least the second side wall of the shaped part and at least part of the end is thus in the cavity of the shaped body, the outer end at least in the piercing region being preferably fixed to the second side wall.

In the second side wall, a through hole is provided through which the mounting strut extends and projects into the cavity between the side walls. The mounting strut is fixed in the through holes, for example is welded at the through hole to the second side wall of the shaped body. The mounting strut can be pushed into the cavity through the through holes as far as desired and then be fixed to the second leg. The insertion depth can determine the force-displacement curve on impact.

The further the mounting strut is inserted into the through hole, the smaller the spacing between the end face of the mounting strut and the first side wall and thus to the cross member and the like, in the event of an impact, energy acting on the vehicle is absorbed initially by the mounting struts.

The mounting strut can be pushed so far through the through holes that its end face bears on the first side wall and is preferably fixed thereto.

The mounting strut can also be pushed through the through holes so far that it also extends through the first side wall and the outer end of the mounting strut forms a gap between the cross member and the first side wall is arranged or directly mounted on the cross beam.

It is preferably provided that the outer end of each strut rests with his front face against the first side wall and is preferably firmly bonded to it.

In the event of a frontal impact, this results in a particularly advantageous force-displacement curve.

Embodiments of the bumper assembly according to the invention are shown in the figures and explained in more detail below. Therein:

FIG. 3 shows a bumper assembly with a center part of oval cross section;

FIG. 4 illustrates different cross sections of a bumper assembly;

FIG. 5 shows details of a bumper assembly for different connection variants between a mounting strut and the cross member.

Figure 1:
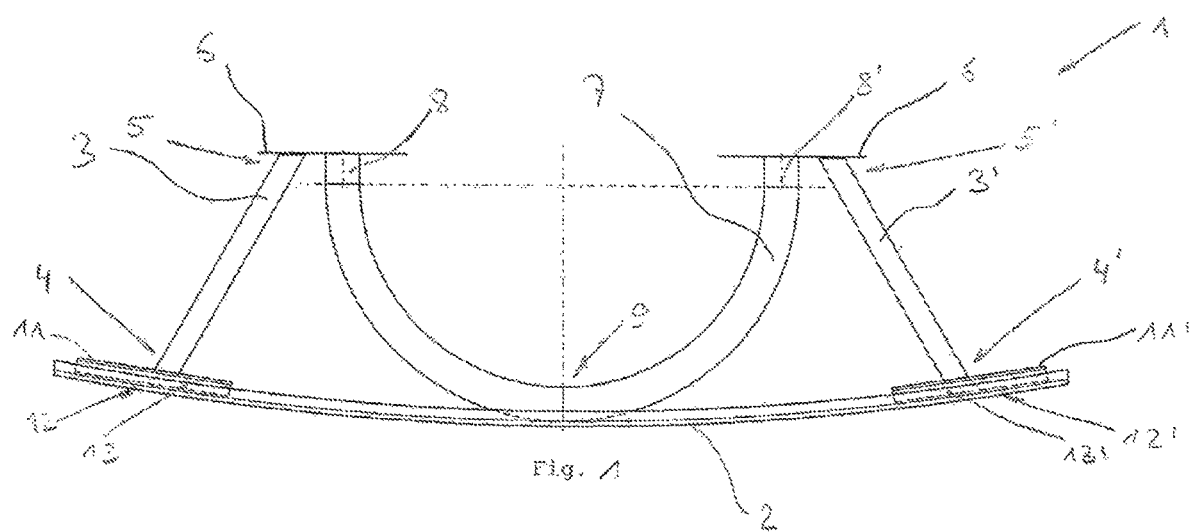
FIG. 1 shows a bumper assembly of semicircular shape.

The figures show a bumper assembly 1 for a motor vehicle, for a low load plane.

The bumper assembly 1 has a bumper cross member 2 and two spaced mounting struts 3, 3' whose outer ends 4, 4' are each connected via a respective hollow shaped body 11, 11' to or near a respective one of the ends of the bumper cross member 2. Inner ends 5, 5' of the mounting struts 3, 3' are each secured by a respective screw-on plate to the vehicle chassis or frame 6. The mounting struts 3, 3' hold the bumper cross member 2 on the vehicle. Furthermore, the bumper assembly 1 includes a preferably symmetrically curved brace 7 mounted behind the transverse beam 2. This is tubular in the embodiments. The curved brace 7 is between the vehicle structure and the cross member 2, the brace 7 being attached at its ends 8, 8' near the inner ends 5, 5' of the mounting struts 3, 3' on the chassis or frame 6 and having a center part 9 that extends outward toward the bumper cross member 2. The brace 7 bears outward with the center part 9 at least partially on the bumper cross member 2. It is also possible to fixed the center part 9 of the crossbeam 2 to the cross member 2 and thereby prevent a lateral sliding of the brace 7 in the event of an eccentric impact on the front of the vehicle.

The center part 9 supports and reinforces the cross member 2 in the event of a frontal impact. Upon impact, both the cross member 2 and the arcuate brace 7 are deformed so that an even higher impact energy can be absorbed than with bumper assemblies whose cross members 2 are braced directly against the vehicle structure.

Since the brace 7 bears with its center part 9 on the cross member 2, the cross member 2 is on and immediately after impact supported and reinforced from behind. By its preferably symmetrical curvature toward the cross member 2, the brace 7 has an optimal shape for dissipating the applied energy evenly over a defined path.

In the event of an impact acting centrally on the vehicle, such as in a pile test, the cross member 2 and the curved brace 7 behind it deform around the obstacle (for example the pile) and absorb the energy introduced, with the connection to the cross beam improved at the same time.

The mounting struts 3, 3' serve to hold the cross member 2 on the vehicle structure and to support the cross member 2 near its ends. During impact, the mounting struts 3, 3' partially deformed and absorb part of the impact energy, with the mounting struts 3, 3' at the same time supporting and bracing the regions of the cross member 2 near the end for buckling of the cross member 2 and the curved brace 7 at the preferred locations.

This arrangement enables an even and increased energy dissipation, whereby at the same time ensuring good cross-connection with the vehicle frame. The bumper assembly 1 is particularly inexpensive to manufacture and is of very low weight. The curved brace 7 and the mounting struts 3, 3' are tubular. Due to the tubular construction, the bumper assembly 1 has only a low weight. A section of pipe can also be inexpensively processed into the curved brace 7.

FIG. 1 shows a bumper assembly 1 in which the brace 7 is semicircular. Such a brace 7 is particularly inexpensive to manufacture because it is simply formed from a straight pipe, for example, without creating different cross sections or shapes.

Figure 2:
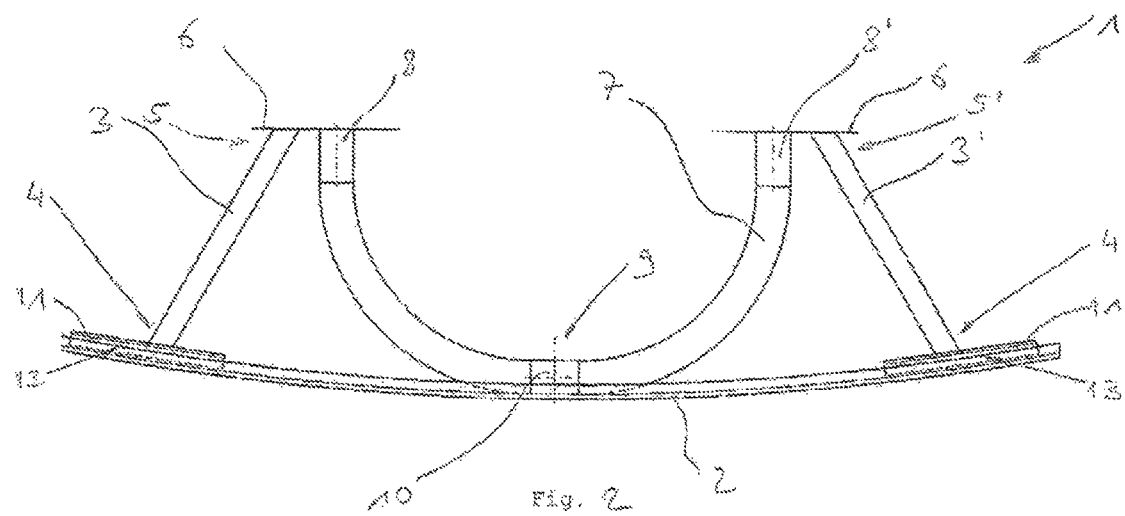
FIG. 2 shows a C-shaped bumper assembly.

FIG. 2 shows an alternative embodiment in which the curved brace 7 is C-shaped and the brace 7 has a straight part 10 bearing on the cross member 2.

The C-shaped brace 7 has straight end parts 8, 8' connected to the chassis or frame 6. In the center part 9, the brace 7 has a straight region 10. These straight parts ensure a particularly advantageous deformation of the brace 7, so that improved energy absorption is achieved, while at the same time the cross-connection to the chassis or frame is improved. The center part 9 lies with the straight region 10 on the cross member 2 so that the center part 9 abuts not at a point, but over a larger a flat portion of the cross member 2, the term abut is also to be understood to include a small gap between the cross member 2 and the center part 9, in order to prevent rattling occurring during travel. This results in the advantage that the cross member 2 is supported from behind over a larger region and the brace 7 does move laterally when an obstacle hits the front of the vehicle off-center, but instead there is simultaneous deformation of the cross member 2 and the brace 7.

The brace 7 can also have regions that have different cross sections, as for example shown in FIG. 4 (right figure). The brace 7 is of round cross section, and the center part 9 is of approximately oval cross section. The elongated surfaces of the oval section have a larger contact region with the cross member 2 than, for example, with a round cross section. As a result, the possibility of lateral sliding of the brace 7 when an obstacle hits off-center on the front of the vehicle is avoided.

In the event of a front impact, the cross member 2 is approximately in the middle and the center of the cross member 2 bearing on the center part 9 of the brace 7 is first deformed. Due to the tapering cross section of the brace 7 in this region, it can be more easily deformed, so that over the deformation path a particularly uniform and thereby advantageous energy absorption can take place.

The brace 7 and/or the mounting struts 3, 3' can preferably be made of steel, aluminum or magnesium or made of fiber composites. These materials enable inexpensive production of these parts.

The brace 7 and/or the mounting struts 3, 3' can have regions of lower strength so that they are deformed uniformly and particularly advantageously and there is even energy dissipation. The brace 7 can for example be made of high strength manganese boron steel, and in the center part 9 an additional temperature control process the component 7 can impart to it a lower strength in connection with higher elongation value.

In addition, the center part 9 that bears on the bumper cross member 2 can be non-positively, positively or cohesively connected to the cross member 2, and for example, to prevent, in the event of an eccentric impact, that the brace 7 slips and therewith possibly the deformation and energy absorption does not take place. in this case, the center part 9 lies directly and flat on the cross member 2.

The outer ends 4, 4' of the mounting struts 3, 3' are made with the hollow shaped body 11, 11' of sheet metal that is attached to the bumper cross beam 2. The hollow shaped body 11, 11' has a rectangular cross section with first and second side walls parallel to each other and to the bumper cross member 2 and two side walls connecting first and second side walls, so that the shaped body 11, 11' is fixed to parts of the cross member 2 and the outer ends 4, 4' of the mounting struts 3, 3' are fixed to the shaped body 11, 11'. The hollow shaped body 11, 11' serves as an additional deformation element between the outer ends 4, 4' of the mounting struts 3, 3' and the cross member 2. The shaped body 11, 11' is on parts of the fixed cross member 2, the cross member 2 being of U-section with a base 14 and two side walls 15, 16 projecting therefrom and a base wall of the shaped part 11, 11' fixed to a leg 15 or 16 of the cross member 2, for example screwed or welded on. The side walls of the shaped part 11, 11' are parallel to the cross member 2, in particular to the base wall 14 of the cross member 2, and the base wall 14 forms the surface facing an obstacle and the side walls 15, 16 project from the base wall 14 toward the vehicle structure.

Between the cross member 2 and the first side wall of the shaped body 11, 11' is a gap 12, 12' shown in FIGS. 1, 2, 3 and 5. The size of this gap 12, 12' can be selected as desired, so that a larger or smaller spacing is provided between the first side wall and the cross member 2, the gap 12, 12' ensures no damage in the event of a light impact to the hollow shaped body 11, 11', but only an elastic deformation of the cross member 2 takes place. FIG. 5 shows examples of gaps 12, 12' of different sizes, with the gap 12, 12' largest in example a) and smallest in example c).

FIG. 5 also shows possibilities of using a mounting strut 3, 3' with a tubular shaped body 11, 11'.

The outer end 4, 4' of the mounting strut 3, 3' can be fixed with its end face on the second side wall of the shaped part 11, 11', as shown in variant c). On impact the shaped body 11, 11' deforms before deformation of the mounting strut 3, 3'. If it is a light impact, shaped part 11, 11' will only be deformed. The mounting struts 3, 3' remain undamaged. The mounting strut 3, 3' is welded on its outer side to the shaped body 11, 11'.

Alternatively, the outer end 4, 4' of the mounting strut 3, 3' can extend through the second side wall of the shaped part 11, 11' so part of the end 4, 4' is in a cavity 13, 13' of the shaped body 11, 11'. In the penetration region, the mounting strut 3, 3' is fixed to the second fixed side wall. This variant is shown in FIG. 5b. The second leg region is formed with through holes through which the mounting strut 3, 3' is inserted and where it projects into the cavity 13, 13' between the side walls. The mounting strut 3, 3' is welded in place at the through holes, with the mounting strut 3, 3' extending as far as desired through the through-hole into the cavity 13, 13' and then fixed to the second leg. The force-displacement curve for impact can be determined and optimally adjusted by the insertion depth.

The more the mounting strut 3, 3' is inserted into the perforation, the smaller is the spacing of the end face of the mounting strut 3, 3' to the first side wall and thus to the cross member 2 and the sooner the energy acting on the vehicle in the event of a collision the mounting struts 3, 3' is applied.

A third variant is shown in FIG. 5*a*, in which the mounting strut 3, 3' so far through the through hole is pushed that it pierces the first side wall and a part of the outer end 4, 4' of the mounting strut 3, 3' in the gap 12, 12' between the cross member 2 and the first side wall is arranged. For this purpose, the first side wall also has a through holes through which the end 4, 4' of the strut 3, 3' is inserted and in which the mounting strut 3, 3' is additionally fixed.

The different variants allow a particularly advantageous setting of the force-displacement curve, so that an optimal energy absorption of the bumper assembly 1 can be set.

The invention is not limited to the embodiment, but within the scope of revelation variable in many ways.

All in the description and/or drawing disclosed individual and combination features are regarded as essential to the invention.

The invention claimed is:

1. A bumper assembly for a motor vehicle having a frame, the bumper assembly comprising
   a bumper cross member;
   two spaced mounting struts each having an outer end attached directly or indirectly at a respective region of the bumper cross beam member and an inner end attached on the frame, the mounting struts fixing the bumper cross member on the vehicle;
   a curved brace in the form of a tube, channel, or profile and having brace ends attached near the inner ends of the mounting struts to the frame and a center part projecting toward and at least bearing on the bumper cross member such that in the event of a frontal impact the cross member, the brace, and in some cases the struts are deformed and absorb energy of the impact, the brace tapering in cross-sectional area from each of the brace ends toward the center part; and
   respective hollow, shaped, sheet-metal bodies securing the outer ends of the mounting struts to the bumper cross member, the hollow bodies each having first and second side walls parallel to each other and to the bumper cross member and at least one base wall connecting the side walls, each shaped body being fixed between the bumper cross member or respective parts of the bumper cross member and the outer end of a respective one of the mounting struts, the outer end of each mounting strut being fixed with a respective end face on the side wall of the respective shaped body.

2. The bumper assembly according to claim 1, wherein the curved brace is of round, polygonal, oval, U-shaped or generally semicircular cross section.

3. The bumper assembly according to claim 1, wherein the brace is of semicircular shape.

4. The bumper assembly according to claim 1, wherein the brace is of C-shape.

5. The bumper assembly according to claim 1, wherein the curved brace has a straight region, with which the brace at least bears on the bumper cross member.

6. The bumper assembly according to claim 1, wherein the brace has regions of different cross sections.

7. The bumper assembly according to claim 1, wherein that the brace is made of steel, aluminum or magnesium or consists of fiber-composite material.

8. The bumper assembly according to claim 1, wherein that the brace has regions of lower strength.

9. The bumper assembly according to claim 1, wherein the center part rests on the bumper cross member and is frictionally, positively or unitarily connected therewith.

10. The bumper assembly according to claim 1, wherein a respective gap is formed between the bumper cross member and each of the first side walls.

11. The bumper assembly according to claim 1, wherein the brace is of symmetrical shape.

12. The bumper assembly according to claim 1, wherein the mounting struts are each of round, polygonal, oval, U-shaped or generally semicircular cross section.

13. The bumper assembly according to claim 1, wherein the mounting struts have regions of different cross sections.

14. The bumper assembly according to claim 1, wherein the mounting struts are made of steel, aluminum or magnesium or consist of fiber-composite material.

15. that the mounting struts have regions of lower strength.

16. A bumper assembly for a motor vehicle having a frame, the bumper assembly comprising
   a bumper cross member;
   two spaced mounting struts each having an outer end attached directly or indirectly at a respective region of the bumper cross member and an inner end attached on the frame, the mounting struts fixing the bumper cross member on the vehicle;
   a curved brace in the form of a tube, channel, or profile and having brace ends attached near the inner ends of the mounting struts to the frame and a center part projecting toward and at least bearing on the bumper cross member such that in the event of a frontal impact the cross member, the brace, and in some cases the struts are deformed and absorb energy of the impact, the brace tapering in cross-sectional area from each of the brace ends toward the center part; and
   respective hollow, shaped, sheet-metal bodies securing the outer ends of the mounting struts to the bumper cross member, the hollow bodies each having first and second side walls parallel to each other and to the bumper cross member and at least one base wall connecting the side walls, each shaped body being fixed between the bumper cross member or respective parts of the bumper cross member and the outer end of a respective one of the mounting struts, the outer end of each mounting strut projecting through at least the second side wall of the respective shaped part and at least part of the strut being in the cavity of the shaped body, each of the outer ends being fixed to the second side wall at least where the strut passes through to the second side wall.

17. The bumper assembly according to claim 16, wherein the first end of each strut is unitarily fixed with its end face on the respective first side wall.

\* \* \* \* \*